United States Patent
Casais

(10) Patent No.: US 6,288,641 B1
(45) Date of Patent: Sep. 11, 2001

(54) ASSEMBLY, AND ASSOCIATED METHOD, FOR REMOTELY MONITORING A SURVEILLANCE AREA

(75) Inventor: Eduardo Casais, Espoo (FI)

(73) Assignee: Nokia Corporation, Espo (FI)

( * ) Notice: Subject to any disclaimer, the term of this patent is extended or adjusted under 35 U.S.C. 154(b) by 0 days.

(21) Appl. No.: 09/396,692

(22) Filed: Sep. 15, 1999

(51) Int. Cl.[7] .............................. G08B 1/08; H04R 29/00
(52) U.S. Cl. .................... 340/539; 340/505; 340/540; 340/825.36; 340/825.72; 367/198; 379/37; 381/56
(58) Field of Search ....................... 340/539, 505, 340/506, 825.06, 825.07, 566, 825.25, 540, 541, 825.36, 825.49, 825.69, 825.72; 367/197–199; 379/37, 38; 381/56, 58

(56) References Cited

U.S. PATENT DOCUMENTS

| | | | |
|---|---|---|---|
| 4,511,886 | * | 4/1985 | Rodriguez ........................... 340/534 |
| 4,924,211 | * | 5/1990 | Davies ................................ 340/573 |
| 5,416,725 | | 5/1995 | Pacheco et al. ................... 340/508 |
| 5,546,072 | * | 8/1996 | Creuseremee et al. ............. 340/574 |
| 5,736,927 | * | 4/1998 | Stebbins et al. .................... 340/506 |

FOREIGN PATENT DOCUMENTS

| | | |
|---|---|---|
| 29805651 | 8/1998 | (DE) . |
| 0417944 | 3/1991 | (EP) . |
| WO98/16412 | 4/1998 | (WO) . |

OTHER PUBLICATIONS

Sietmann, R.: "Mobil Ins Internet. Wireless Application Protocol Adaptiert Mobiltelefone Fur Das WWW", CT Magazin Fuer Computer Technik, DE, Verlag Heinz Heise GMBH, Hannover, No. 4, 1998, pp. 202–207, XP00073283, ISSN: 0724–8679, p. 1, line 1–65.

* cited by examiner

Primary Examiner—Donnie L. Crosland

(57) ABSTRACT

An assembly, and an associated method, by which to remotely monitor a surveillance area. Wireless microphones are positioned at selected locations in the surveillance area, and signals generated by the microphones are detectable by a controller. A mobile terminal operable in a cellular, or other radio, communication system forms a communication link with the controller and signals generated by the wireless microphone are routed to the mobile terminal.

22 Claims, 3 Drawing Sheets

ASSEMBLY, AND ASSOCIATED METHOD, FOR REMOTELY MONITORING A SURVEILLANCE AREA

The present invention relates generally to a manner by which to monitor remotely a surveillance area through the use of radio communication techniques. More particularly, the present invention relates to an assembly, and an associated methodology, by which to monitor remotely the surveillance area through the use of a mobile terminal, such as a mobile terminal utilized in a conventional, cellular communication system.

BACKGROUND OF THE INVENTION

The use of monitoring systems to permit remote monitoring and surveillance of a site is common in many industrial and commercial facilities. The remote monitoring of a site provides a manpower-effective manner by which to observe ongoing activities of the site. Remote monitoring obviates the need for personnel to be physically located at the site to make observations of the ongoing activities thereat. When, for example, an abnormal condition is detected at the site by the remote monitoring system, appropriate action can be taken.

In industrial applications, monitoring systems are sometimes utilized to permit remote monitoring of an industrial process. If an abnormal process condition is detected as a result of the monitoring, appropriate action is taken. Also in industrial, as well as commercial and residential applications, remote monitoring systems are utilized, for instance, for security purposes. Monitoring of a site permits remote detection of an abnormal condition. Responsive to detection of an abnormal condition, appropriate action, such as alerting of security personnel, can be initiated. Also, in the absence of an abnormal condition, assurance is provided that the monitored site is secure and without problem.

Existing monitoring systems are, however, generally relatively costly. A significant reason for the relative costliness of existing monitoring systems is that such systems are generally constructed for centralized monitoring of a site through the use of a closed-circuit system. In such systems, sensors are permanently installed at the surveillance site. And, a central control and surveillance unit is typically in permanent communication with the sensors and is maintained in a static, non-mobile location. The apparatus utilized in such systems usually includes specialized monitoring devices which are typically geared toward the automatic detection of abnormal conditions. That is to say, such apparatus typically requires specialized logic, advanced sensors, or additional software to analyze sensed data to permit automatic alerts to be sounded.

Generally, existing monitoring systems do not take advantage of advancements in communication technologies which have permitted the implementation, and popular usage of new types of communication systems. Radio communication systems are exemplary of communication systems which have advantageously incorporated advancements in communication technologies. A cellular communication system is a type of radio communication system which has achieved wide levels of usage.

A cellular communication system provides a cost-effective manner by which to communicate telephonically. Both voice and non-voice data is typically able to be communicated through the use of a cellular communication system. Large numbers of subscribers to such systems communicate on a regular basis through the use of such systems.

Mobile terminals are utilized by subscribers to communicate therethrough both to receive and to transmit communication signals with network infrastructure of the communication system. Many constructions of mobile terminals are of physical dimensions which permit their hand-carriage by a subscriber and storage in a shirt pocket, or the like, of a subscriber. Increased mobility of communications is provided by the use of a cellular, or other radio, communication system.

The increased communication mobility, as well as cost-effectiveness of communications, provided by a cellular, or other radio, communication system has not generally, to date, been incorporated in remote monitoring systems. If a manner could be provided by which to incorporate the advantages provided by existing cellular, or other radio, communication systems, in remote monitoring systems, mobility, in an affordable manner, could be provided to a remote monitoring system. Increased continuance of monitoring of a site would be provided, all at an affordable cost.

Analogously, the advantages provided by radio communication systems have generally also not been incorporated into communications with sensors. That is to say, generally, sensors utilized in conventional monitoring systems are fixed in position in a wired connection with a remote monitoring location. Flexibility of positioning of the sensors is, therefore, limited as a result of the use of conventional wired connections. While, e.g., Bluetooth radio technology standards are in place to permit devices to communicate with one another without wired connections therebetween, the use of such technologies have generally not been utilized in remote monitoring systems. If a manner could be provided by which to incorporate Bluetooth, or other wireless, radio technologies in remote monitoring systems, increased flexibility of such systems would be provided.

It is in light of this background information related to remote monitoring systems that the significant improvements of the present invention have evolved.

SUMMARY OF THE INVENTION

The present invention, accordingly, advantageously provides an assembly, and associated methodology, by which to remotely monitor a surveillance area through the use of radio communication techniques.

In one implementation, a manner is provided by which to monitor a site through the use of a mobile terminal, such as a mobile terminal operable in a conventional cellular communication system. Transducers, such as audio microphones, are positioned at selected locations throughout a site to be monitored. Transduced signals generated by a selected transducer are forwarded to the mobile terminal, thereby to permit the user of the mobile terminal to monitor a portion of the surveillance site encompassed by the selected transducer.

In one implementation, the transducers positioned at the selected locations throughout the surveillance site form acoustic transducers, e.g., wireless microphones, operable to convert acoustic signals into electromagnetic form. The transduced signals into which the acoustic signals are transduced are detected by transceiver circuitry of a controller. Transduced signals are converted into a form to permit their routing to the infrastructure of the cellular communication system, from which the signals are forwarded to the mobile terminal over a radio-link formed during operation of the cellular communication system. Because the transducers do not need to be connected in wired connections with other portions of the monitoring system, system installation is simplified and the flexibility of such a system is increased as the transducers can be readily moved to be positioned, as desired. And, additional transducers can readily be added to the system.

In one implementation, selection is made at the mobile terminal from which of the spaced-apart transducers the transduced signals are forwarded to the mobile terminal. The mobile terminal is provided with an indication of the transducers, such as by providing a listing of the transducers positioned at the surveillance site thereto. Responsive to selection of the selected transducer, indications of the transduced signals transmitted by the selected transducer is forwarded to the mobile terminal. Because a mobile terminal, already used in an existing cellular communication system is utilized, the mobility inherent of a mobile terminal and the cost efficiencies of utilization of a cellular communication system are also provided.

The cellular communication system in which the mobile terminal is operable, for instance, is the GSM (global system for mobile communications) system in which SMS (short message service) messaging is permitted. A user of the mobile terminal initiates monitoring operations by causing the mobile terminal to generate an SMS message requesting that a particular surveillance site be monitored. The SMS message is routed to a controller which controls monitoring operations at the surveillance site. Responsive to reception of the SMS message, a listing of available transducers is returned to the mobile terminal. Selection of a transducer indicated in the listing is made by the user of the mobile terminal, and another SMS message, indicating the user's selection is generated by the mobile terminal. The message is forwarded to the controller which causes activation of the selected transducer. Then, the controller initiates effectuation of a voice channel with the mobile terminal. Once a voice channel has been established, the transduced signals selected by the selected transducer and detected by the transceiver circuitry of the controller, are forwarded upon the voice channel to the mobile terminal.

In another aspect of the present invention, a controller is provided for controlling operation of wireless transducers positioned at selected locations throughout the surveillance site. The controller is operable to activate selected transducers and to receive transduced signals generated by the selected transducers. In one implementation, communications between the controller and the transducers is effectuated utilizing a standard, open technology such as Bluetooth communications. The controller is also coupled to a cellular communication network at which a voice channel is configurable to form a communication path between the controller and a mobile terminal. The controller is further operable to direct the transduced signal generated by the selected transducer on to the voice channel, thereby to permit the mobile terminal to remotely monitor the surveillance site. When the user of the mobile terminal decides to no longer monitor the portion of the surveillance site encompassed by the selected transducer, the user merely terminates the voice channel connection, such as by terminating the call terminated at the mobile terminal. If the user of the mobile terminal desires to monitor another selected portion of the surveillance site, a subsequent request is made to the controller and a subsequent transducer is activated.

Because remote monitoring is effectuated through use of a conventional mobile terminal, operable generally in conventional manner in a cellular communication system, an affordable, and mobile, manner is provided by which to monitor a surveillance site.

And, because the remote monitoring is effectuated through use of wireless transducers, such as those utilizing Bluetooth technologies, increased flexibility of positioning, and repositioning, of the transducers is provided by which to monitor a surveillance site.

In these and other aspects, therefore, an assembly, and an associated method, is provided for remotely monitoring at least a portion of a surveillance area. At least one transducer is positioned at the at least the selected portion of the surveillance area. The transducer is selectably operable for transducing human-perceptible signals into transduced signals. A controller is coupled at least selectively to receive the transduced signals generated by the at least one transducer. The controller controls selection of operation of the transducer to transduce the human-perceptible signals into the transduced signals. A mobile terminal is operable to transceive communication signals. The mobile terminal is selectively operable to communicate with the controller and, in turn, to receive the transduced signals generated by the transducer, thereby to monitor the at least the selected portion of the surveillance area.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
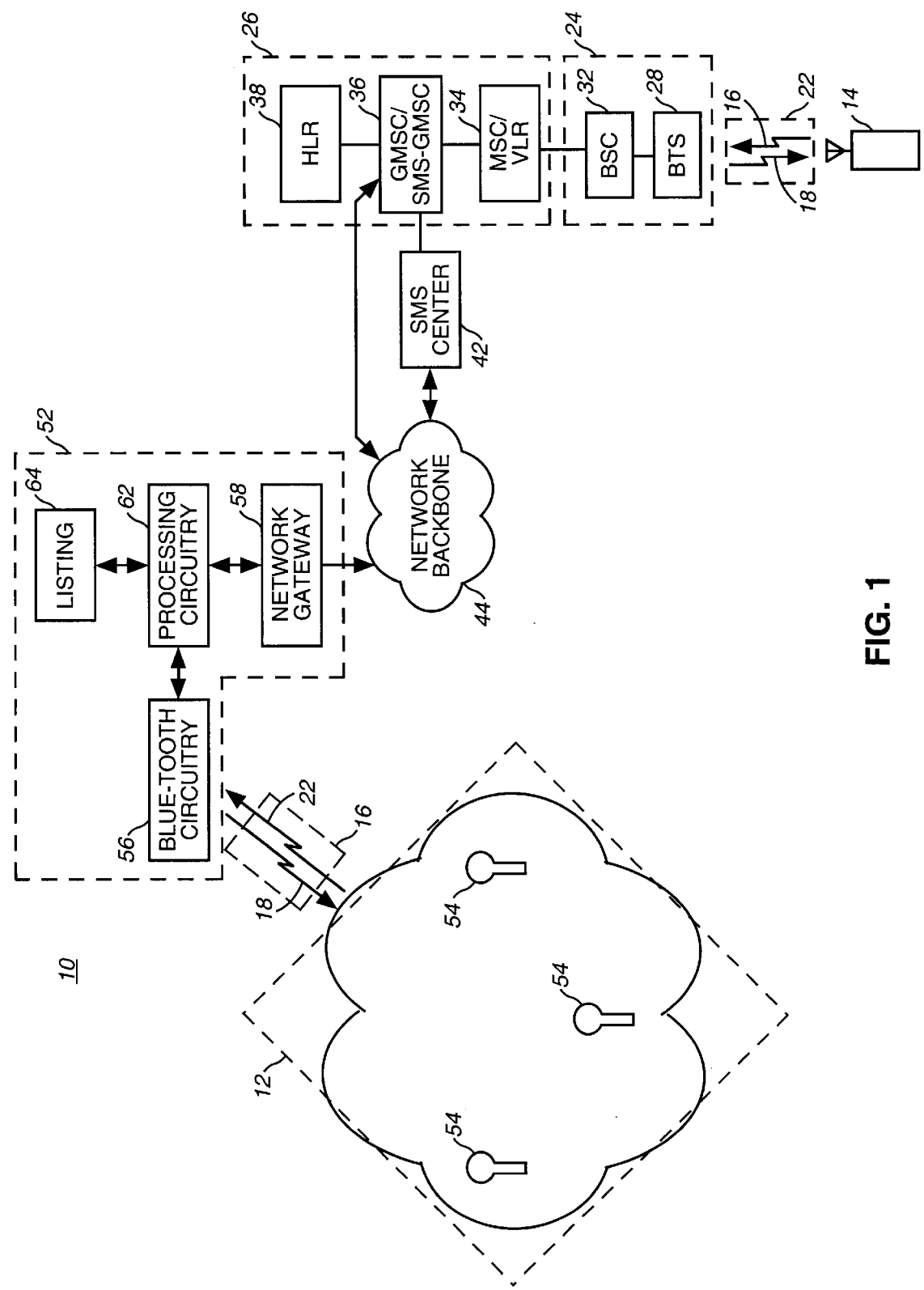
FIG. 1 illustrates a partial functional block, partial schematic diagram of a communication system in which the assembly of an embodiment of the present invention is operable.

Referring first to FIG. 1, a communication system, shown generally at 10, in which an embodiment of the present invention is operable. In the exemplary implementation, operation of the embodiment of the present invention permits remote monitoring of a surveillance site 12 by a user of a mobile terminal, of which the mobile terminal 14 is representative. Because monitoring is performed by way of the mobile terminal, mobility is provided to monitoring operations. In the exemplary implementation, the mobile terminal is operable in a conventional, cellular communication system, here a GSM (Global System for Mobile Communications) cellular communication system. In other implementations, the mobile terminal 14 is operable pursuant to other types of radio communication systems.

The mobile terminal 14 is operable to transceive communication signals by way of a radio-link 16 having a forward link 18 and a reverse link 22. Network infrastructure of the cellular communication system is here shown to include a base station system 24 and a switching system 26. The base station system is here shown to include a base transceiver station 28 and a base station controller 32. The base station transceiver 28 is operable in conventional manner to transceive the communication signal with the mobile terminal 14. And, the base station controller 32 is operable to control operation of groups of the base transceiver stations.

The base station system 24 is coupled to the switching system 26. The switching system 26 is here shown to include a mobile switching station/visiting location register, a gateway mobile switching center 34, and SMS (short message service)-gateway mobile switching center, 36, and a home location register 38. The SMS-gateway mobile switching center 36 is coupled to an SMS center 42. The SMS center 42 is operable as a store and forward center for storing and forwarding SMS messages, such as SMS messages originated at, or to be terminated at, the mobile terminal 14.

The SMS center 42 is coupled to a network backbone 44. The network backbone 44 is exemplary of a conventional network backbone and is here representative of both a packet data network backbone, such as the Internet and also a public switched telephone network. The network backbone is therefore also shown to be coupled to the gateway mobile switching center 36.

A controller 52, here located at the surveillance site 12 is also coupled to the network backbone 44. In other implementations, the controller 52 is positioned remote from the surveillance site and are capable of forming communication connections thereto. The controller 52 is capable of communicating with the terminal 14 by way of the network backbone 44 and the network infrastructure of the radio communication system in which the mobile terminal is operable. And, in still other implementations, the controller 52 is coupled indirectly to the network backbone. In one such implementation, the controller is connected, by way, e.g., of a cable or infrared connection, to a cellular mobile terminal. And, communications are effectuated via a cellular communication system. And, in another such implementation, the cellular terminal comprises a card inserted into an appropriate slot of the controller. Normal cellular functionality is thereby provided. In both of these last two implementations, the controller is connected to the cellular network in the same way as terminal 14, that is, via the radio link 16, the base station subsystem 24, and the switching system 26.

The surveillance site 12 includes a plurality of spaced-apart transducers, here microphones 54 for converting acoustic energy into electromagnetic signals. In the exemplary implementation, the microphones 54 are Bluetooth-enabled microphones, operable to generate high-frequency (about 2.4 GHz) electromagnetic signals of values representative of acoustic signals detected by the respective microphones. The electromagnetic signals generated by selected microphones are detectable by the controller 52. During operation of an embodiment of the present invention, the controller is selectably operable to forward the detected signals to the mobile terminal 14 by way of the network backbone and the network infrastructure of the radio communication system over the radio-link 16.

The controller 52 is here shown to include Bluetooth transceiver circuitry capable of transceiving communication signals with selected ones of the microphones 54. The controller further includes a network gateway 58 capable of communicating with the mobile terminal 14 by way of the network backbone and the network infrastructure of the radio communication system, or, in other implementations, by way of a cellular terminal attached to the controller and connected to the cellular network via the radio link, as described above. Processing circuitry 62 of the controller controls operation of the transceiver circuitry 56 and the network gateway 58. A listing 64 is stored at a memory element of the controller. The listing, in one implementation, is formed during operation of the controller 52 by querying the microphones 54 to detect their presence. In another implementation, the listing is created during system creation in which the contents of the listing are provided to the controller to be stored thereat. Utilizing querying of the microphones to form the listing facilitates dynamic repositioning of the microphones as well as alteration of the number of microphones in the system.

When the microphones 54 are appropriately positioned and controller 52 is installed to be in communication contact with the microphones, remote monitoring of the surveillance site permitted at any time at the selection of a user of the mobile terminal. When the user desires to monitor the surveillance site, the user of the mobile terminal causes an SMS message to be generated to inquire of the controller of the listing 64. The SMS message is sent over the radio-link 16 to the network infrastructure, and the message is routed through the network infrastructure to the network backbone and to the controller 52.

Responsive thereto, the listing is retrieved, and an SMS message indicative of the listing is provided to the mobile terminal. The listing is displayed at an output display element, or the like, of the mobile terminal to permit the user to select a selected microphone listed in the listing from which signals are to be monitored by the mobile terminal. A selection is made, such as by user actuation of an actuation key of the actuation keypad of the mobile terminal, and another SMS message is generated by the mobile terminal. The additional SMS message is transmitted upon the radio-link 16, routed through the network infrastructure and network backbone to be delivered to the controller 52. The controller 52, responsive to the selection contained in the SMS message, causes the Bluetooth transceiver circuitry 56 to generate a signal which causes activation of the selected microphone. The selected microphone is activated, and the transceiver circuitry 56 detects the signals generated by the selected microphone.

The controller is further operable to originate a call to the mobile terminal to cause allocation, and formation of a voice channel therebetween. Once the voice channel is established, the controller directs the signals generated by the selected microphone and detected at the controller 52 to be directed over the voice channel to the mobile terminal. Thereby, the user of the mobile terminal is able to monitor a selected portion of the surveillance site defined by the reception range of the selected microphone. Because the surveillance site is monitored through use of a mobile terminal, increased mobility of monitoring operations is permitted. And, because the mobile terminal is operable in a conventional, cellular communication system, monitoring is able to be performed in a cost-effective manner.

Figure 2:
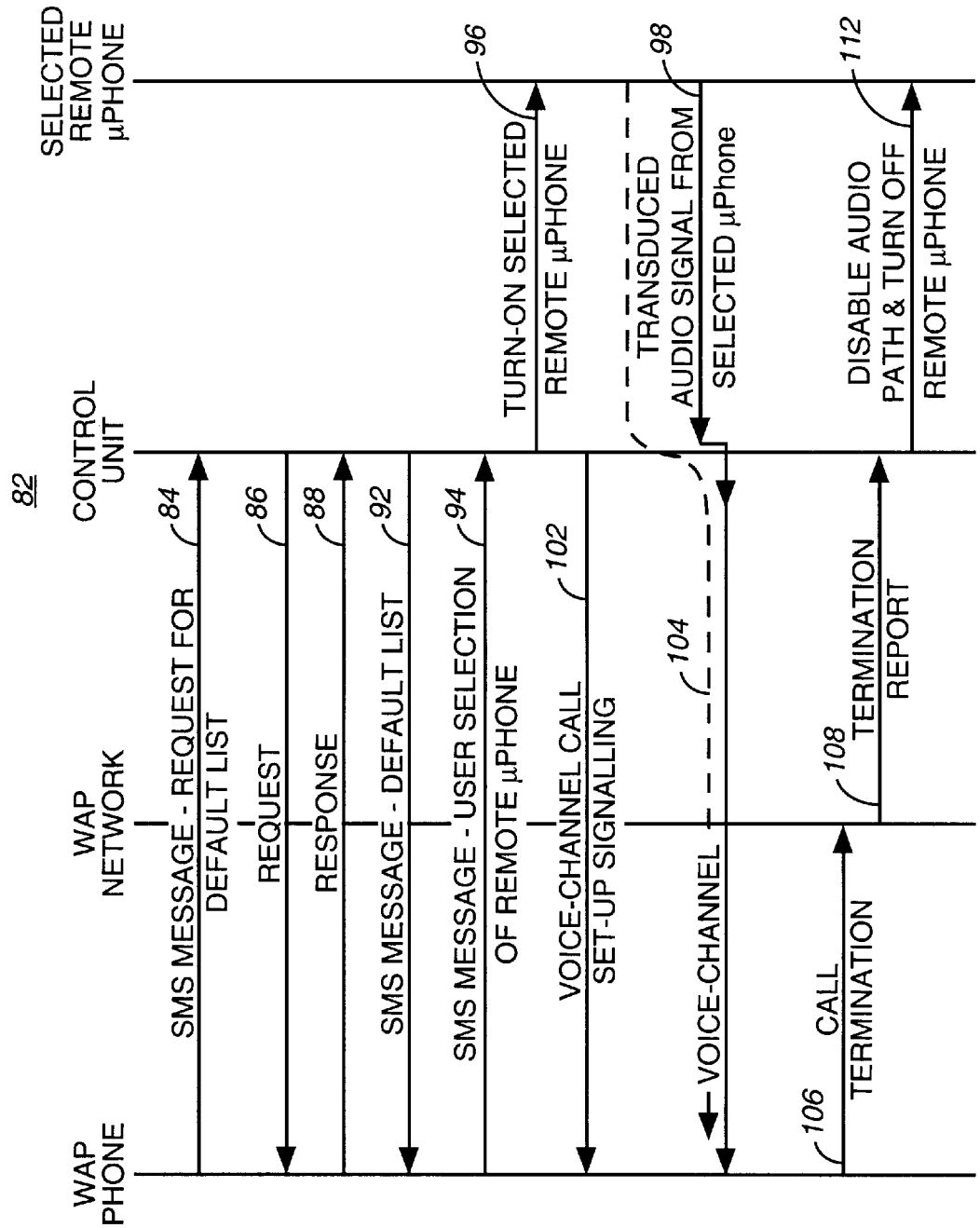
FIG. 2 illustrates a message flow diagram representative of signals generated during operation of an embodiment of the present invention.

FIG. 2 illustrates a method sequence diagram, shown generally at 82, representative of operation of an embodiment of the present invention by which to monitor remotely a surveillance site. The signals represented in the Figure correspond to the signals generated during operation of the embodiment of the present invention shown in FIG. 1. In other implementations, other types of signaling are performed. In such other implementations, analogous signaling is performed. For instance, while the exemplary radio communication system forming a portion of the communication system shown in FIG. 1 is a GSM (Global System for Mobile Communications) communication system providing for SMS (short message service) message generation, in other implementations, communication of information contained in such messages is performed in other manners.

When a user of a mobile terminal desires to monitor a portion of the surveillance site, the user initiates a request to perform the monitoring. The user initiates generation of the request, for instance, through actuation of an actuation key on the telephonic keypad of the mobile terminal. The mobile terminal generates an SMS message, indicated by the segment 84, which is transmitted to the control unit to request that the mobile terminal be permitted to monitor the surveillance site. In one implementation, the identifying phone number is also forwarded to the controller, automatically provided by the network infrastructure, pursuant to transmission of the SMS message.

Responsive to detection of the request, the control unit generates an SMS message, indicated by the segment 86, to request that the mobile terminal provide the controller with its identifying phone number, if the phone number has not yet been provided, a password, and user name. The request is returned to the mobile terminal. Responsive to the request, the mobile terminal generates an SMS message containing the requested information, indicated by the segment 88 which is transmitted to the controller 52. If the password and other associated information is acceptable to the controller, the controller generates an SMS message, indicated by the segment 92, which contains indications of the listing of available microphones positioned at the surveillance site. The SMS message is transmitted to the mobile terminal.

The listing of available microphones is displayed at a display element of the mobile terminal, permitting the user of the mobile terminal to select which of the microphones from which to monitor the surveillance site. Selection is made by the user of the mobile terminal of a microphone contained in the listing, and an SMS message, indicative of the selection by the user is generated, as indicated by the segment 94. The SMS message is transmitted to the controller.

When the controller receives the message, the controller in turn, generates a signal, indicated by the segment 96, to command the selected microphone to be activated and to establish a voice path between the selected microphone and the control unit. The voice path is established, and the selected microphone generates a transduced audio signal, indicated by the segment 98, which is detected by the control unit.

The control unit also initiates effectuation of a voice channel between the control unit and the mobile terminal, indicated by the segment 102. A voice channel is established and the audio signal generated by the selected microphone is directed upon the voice channel to be communicated, indicated by the segment 104, to the mobile terminal.

Monitoring of the surveillance site is thereby effectuated. Monitoring continues for so long as the user desires. When the user decides no longer to monitor the surveillance site, the user terminates the connection with the controller by way of a conventional call termination, indicated by the segment 106. A termination report is generated and provided, as indicated by the segment 108, to the controller. Responsive to detection of the termination report, the controller disables the voice path and instructs the selected microphone to be turned off, indicated by the segment 112.

Figure 3:
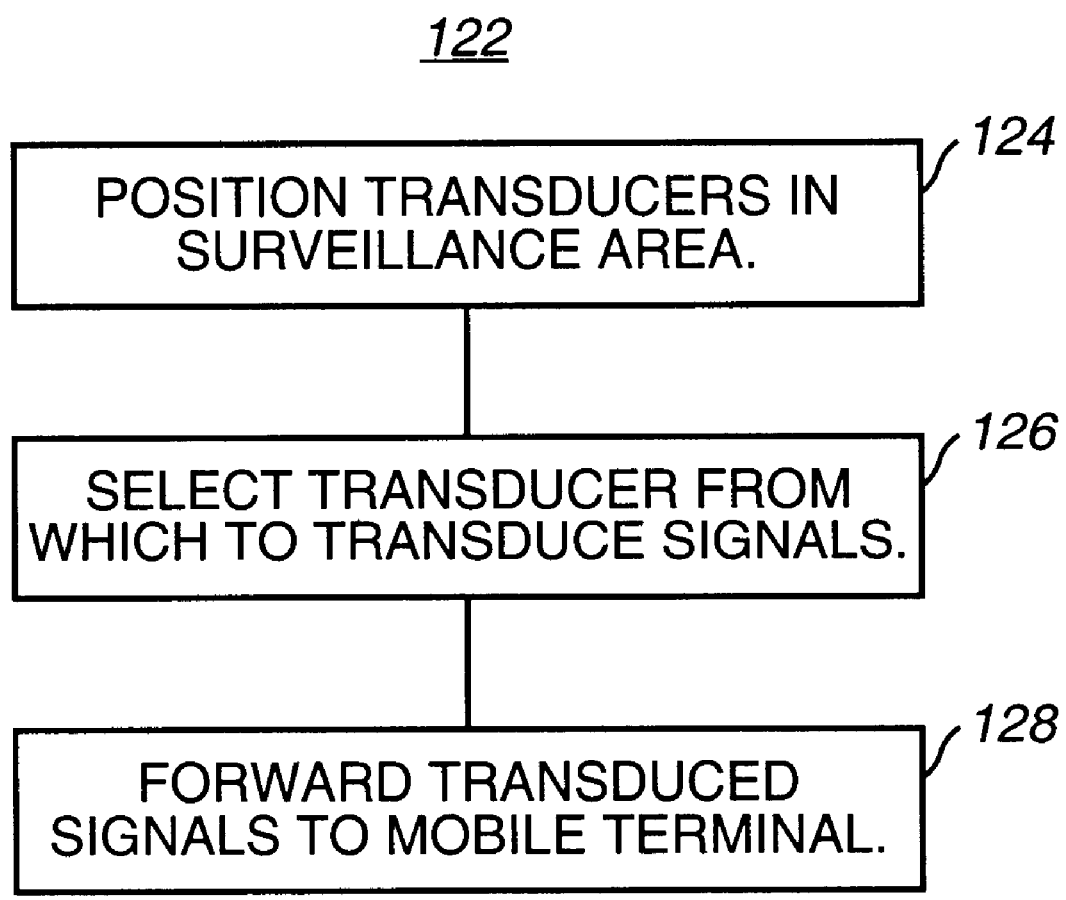
FIG. 3 illustrates a method flow diagram listing the method of operation of an embodiment of the present invention.

FIG. 3 illustrates a method flow diagram, shown generally at 122, of an embodiment of the present invention. The method remotely monitors at least a portion of a surveillance area.

First, and as indicated by the block 124, at least one transducer is positioned at the surveillance area. Each transducer is selectably operable to transduce human-perceptible signals into transduced signals.

Then, and as indicated by the block 126, selection is made as to which of the transducers is to be operated to transduce the human-perceptible signals into the transduced signals.

And, as indicated by the block 128, the transduced signals are forwarded to a mobile terminal, thereby to monitor remotely the portion of the surveillance area.

Thereby, through operation of an embodiment of the present invention, a manner is provided by which to remotely monitor a surveillance area through the use of a mobile terminal, such as that utilized in a conventional cellular communication system. Increased mobility of monitoring operations is provided. And, because a mobile terminal operable in a conventional radio communication system is utilized, a cost-effective manner by which to monitor the surveillance area is provided.

The previous descriptions are of preferred examples for implementing the invention, and the scope should not necessarily be limited by this description. The scope of the present invention is defined by the following claims:

What is claimed is:

1. An assembly for remotely monitoring at least a portion of a surveillance area, said assembly comprising:

at least one transducer selectably positionable at the at least selected portion of the surveillance area, said transducer selectably operable for transducing human-perceptible signals into transduced signals;

a controller containing a listing identifying positioning of said at least one transducer at the surveillance area, the listing dynamically configurable responsive to positioning of the at least one transducer at the surveillance area, said controller coupled at least selectably to receive the transduced signals generated by said at least one transducer, and said controller for controlling selection of operation of said transducer to transduce the human-perceptible signals into the transduced signals;

a mobile terminal operable to transceive communication signals, said mobile terminal selectably operable to communicate with said controller and, in turn, to receive the transduced signals generated by a selected one of said at least one transducer, the selected one selected from the listing contained at said controller thereby to monitor the at least the selected portion of the surveillance area.

2. The assembly of claim 1 wherein the human-perceptible signals which are transduced by said transducer comprise audio signals.

3. The assembly of claim 1 wherein the transduced signals into which said transducer transduces the human-perceptible signals comprise electromagnetic signals transmittable upon a radio-link formed between said controller and said transducer.

4. The assembly of claim 3 wherein said electromagnetic signals comprise Bluetooth signals.

5. The assembly of claim 1 wherein said mobile terminal is operable in a radio communication system having network infrastructure, wherein said mobile terminal is operable to transceive the communication signals with the network infrastructure, wherein a communication path is formed between said mobile terminal and the network infrastructure, and, in turn, with said controller, said mobile terminal selectably operable to communicate by way of the communication path to receive the transduced signals.

6. The assembly of claim 1 wherein said at least one transducer comprises a first transducer and at least a second transducer, said first transducer positioned at a first selected portion of the surveillance area and said second transducer positioned at a second selected portion of the surveillance area.

7. The assembly of claim 6 wherein selection is made at said mobile terminal as to which of said first and at least second transducers, respectively, is operable to transduce the human-perceptible signals into the transduced signals.

8. The assembly of claim 7 wherein said mobile terminal is operable to generate SMS (short message service) messages and wherein the selection made by said mobile terminal is communicated to said controller as an SMS message.

9. The assembly of claim 6 wherein said controller maintains a listing of each of said first and at least second transducers, respectively, and wherein selection is made at said mobile terminal as to which of said first and at least second transducers is operable to transduce the human-perceptible signals responsive to accessing of the listing by said mobile terminal.

10. The assembly of claim 9 wherein said mobile terminal is operable to generate SMS (short message service) messages, wherein a first SMS message is generated by the mobile terminal to access the listing and wherein a second SMS message is generated by the mobile terminal to indicate the selection as to which of said first and at least second transducers is operable to transduce the human-perceptible signals.

11. The assembly of claim 10 wherein said controller is operable to generate SMS messages and wherein said controller is further operable to provide a response-SMS message containing the listing responsive to receipt of the first SMS message.

12. The assembly of claim 11 wherein, responsive to the selection by said mobile terminal, said controller initiates effectuation of a voice channel allocation between said controller and said mobile terminal.

13. The assembly of claim 12 wherein, further responsive to the selection by said mobile terminal, said controller initiates effectuation of a communication link with a selected one of the first and at least second transducers, respectively and to direct the transduced signals received therefrom upon the voice channel.

14. The assembly of claim 13 wherein said mobile terminal is further selectably operable to terminate connection thereof to the voice channel and wherein, responsive to termination of the connection of said mobile terminal with the voice channel, said controller terminates the communication link with the selected one of the transducers.

15. A method for remotely monitoring at least a portion of a surveillance area, said method comprising:

positioning at least one transducer at the at least the selected portion of the surveillance area, each of the at least one transducer selectably operable to transduce human-perceptible signals into transduced signals maintaining a listing identifying the at least one transducer positioned, during said operation of positioning, at the surveillance area;

selecting which of the at least one transducer identified at the listing maintained during said operation of maintaining to operate to transduce the human-perceptible signals into the transduced signals;

forwarding the transduced signals to a mobile terminal, thereby to monitor the portion of the surveillance area.

16. The method of claim 15 wherein the at least one transducer positioned during said operation of transducing transduces audio signals into electromagnetic signals.

17. The method of claim 15 wherein said operation of selecting comprises sending a first message from the mobile terminal to inquire which of the at least one transducer is available to select, requesting providing thereto a listing to the mobile terminal indicating which of the at least one transducer is available, and sending a second message by the mobile terminal with a selection from the listing.

18. The method of claim 17 further comprising the operation of authenticating the mobile terminal prior to providing the listing thereto.

19. The method of claim 17 wherein the first message and the second message are formatted according to a WAP (wireless access protocol) standard and transmitted over SMS.

20. The method of claim 17 wherein the mobile terminal is operable in a cellular communication system permitting of communication of SMS (short message service) messages, wherein the first message, and the second message are SMS messages and wherein the transduced signals are forwarded during said operation of forwarding upon a voice channel.

21. The method of claim 20 comprising the further operation of terminating from the mobile terminal the voice channel, thereby to terminate forwarding of the transduced signals to the mobile terminal.

22. In a radio communication system having a mobile terminal and network infrastructure between which a voice channel is formable to communicate therebetween, an improvement of apparatus for permitting a surveillance area to be remotely monitored by the mobile terminal, said apparatus comprising:

at least one transducer positioned at the surveillance area, said transducer for transducing human-perceptible signals at the surveillance area into electromagnetic signals; and a controller containing a listing identifying positioning of said at least one transducer at the surveillance area, said controller coupled to the network infrastructure and to receive the electromagnetic signals generated by said at least one transducer, and said controller for effectuating a communication link with the mobile terminal to forward the electromagnetic signals thereto.

* * * * *